J. WILLIAMS.
Mill Bush and Spindle.

No. 89,721. Patented May 4, 1869.

Witnesses:
E. Wolff.

Inventor:
John Williams
Attorneys.

United States Patent Office.

JOHN WILLIAMS, OF SULLIVAN, ILLINOIS.

Letters Patent No. 89,721, dated May 4, 1869.

IMPROVED MILL-BUSH AND SPINDLE.

The Schedule referred to in these Letters Patent and making part of the same.

To all whom it may concern:

Be it known that I, JOHN WILLIAMS, of Sullivan, in the county of Moultrie, and State of Illinois, have invented a new and useful Improvement in Mill-Bushes and Spindles; and I do hereby declare that the following is a full, clear, and exact description thereof, which will enable others skilled in the art to make and use the same, reference being had to the accompanying drawings, forming part of this specification.

This invention relates to improvements in mill-bushes and spindles, having for their object to provide an improved arrangement for tightening and lubricating the bearing-surfaces of the spindles and the boxes.

Figure 1:
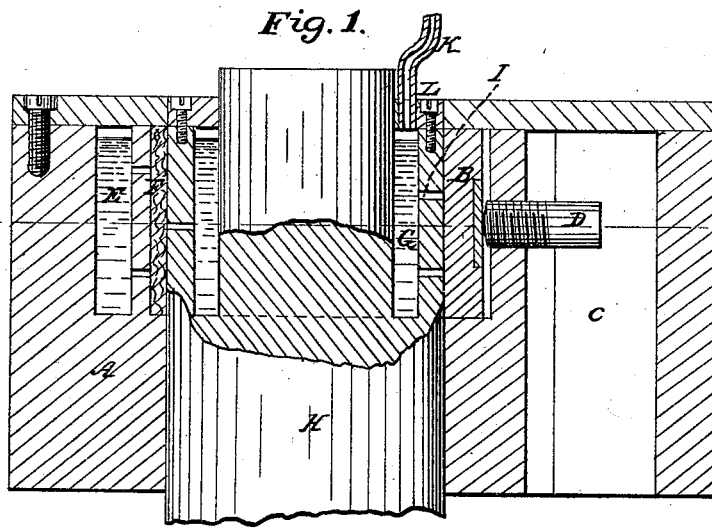

Figure 1 represents a sectional elevation, and

Figure 2:
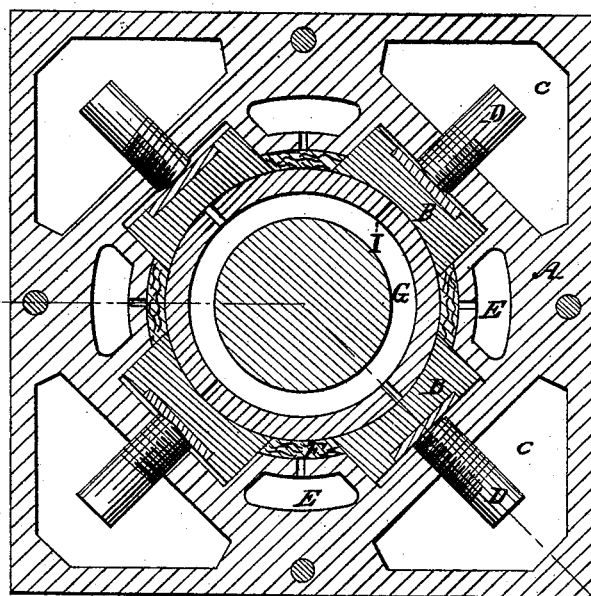

Figure 2, a horizontal section of my improved bush and spindle.

Similar letters of reference indicate corresponding parts.

A represents the bush, which is provided with four recesses for the bearings B, in the usual manner.

Behind the said recesses are enlarged openings C, passing through the bush vertically, affording room to turn the tightening-screws, tapped, through the partition-wall, between the recesses for the bearings and the openings C, and screwing against the backs of the bearings, made of hard metal, in the said back portions, to withstand the action of the screws, which are for tightening the boxes against the spindle.

The said screws may be turned by a wrench, either from the top or the bottom of the bush, and in the latter case it may be done while the stone is running.

Between the spaces for the bearings are pockets E, for tallow or other lubricating-substance; and of the pockets are spaces, or chambers F, for al substance.

Holes are formed through the walls betw pockets and chambers, for the passage of th cant.

To provide for lubricating the bearings, with ing up the stone, I form an annular chambe the enlarged journal, or collar of the spindle ing holes, leading to the bearings, and to the ca the chamber G, I connect a short bent tube, K upward in the eye of the upper stone, to admit ing in oil, melted tallow, or other lubricating-sub which may be done at any time when the sto rest.

Having thus described my invention,

I claim as new, and desire to secure by Patent—

1. The bush A, constructed as described, w cesses for the adjustable bearings B, the open and the pockets E, between the bearings, con cating with the chambers F, containing absorbe stance, all arranged as described, for the purpose fied.

2. In combination with the above, the spin having its enlarged collar provided with the a chamber G, and tube K, as herein described, 1 purpose specified.

JOHN WILLIA

Witnesses:
EDWIN HALL,
G. M. WILLIAMS.